No. 898,007. PATENTED SEPT. 8, 1908.
D. M. ROWE.
EGG CRATE.
APPLICATION FILED MAR. 21, 1907.
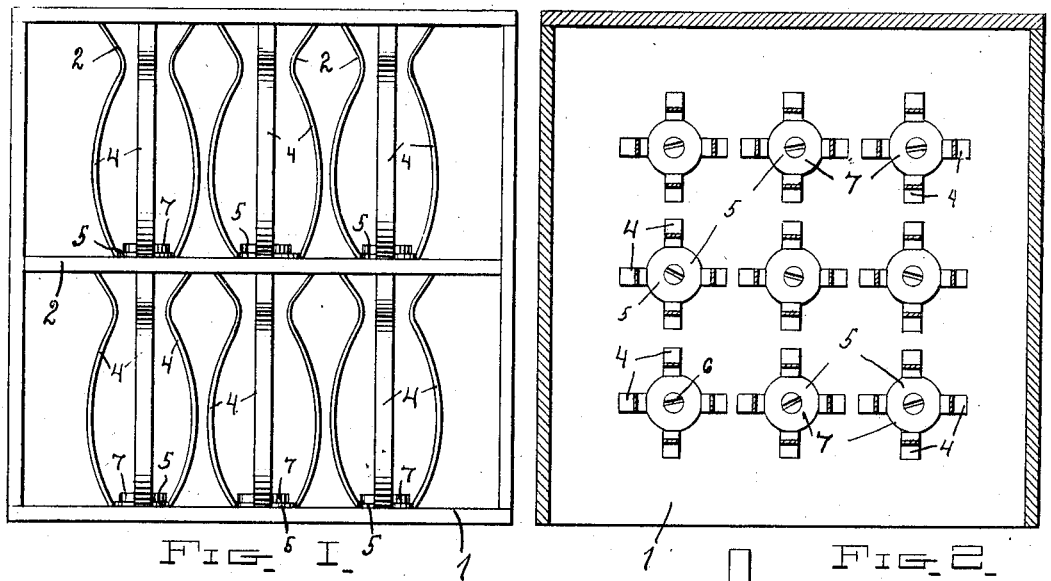
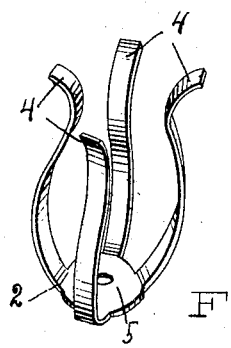
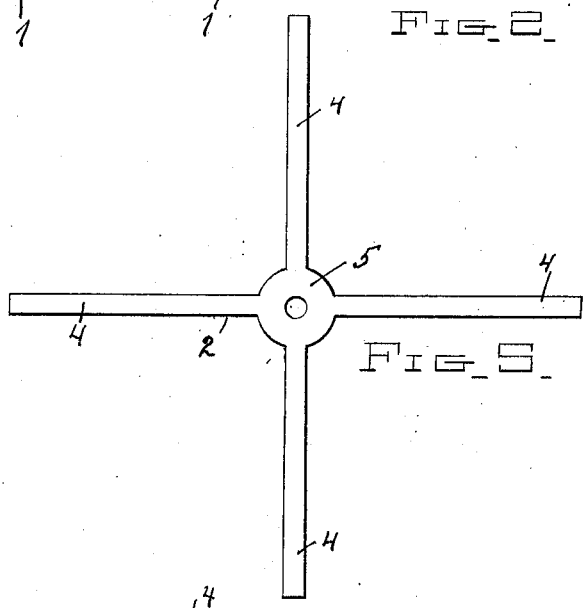
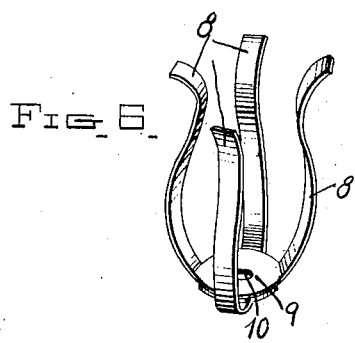
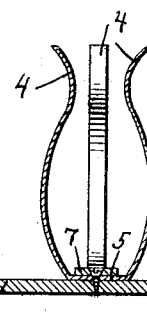
Witnesses
J. Milton Jester
E. H. Griesbauer
Inventor
DAVID M. ROWE
by H. B. Willson & Co.
Attorneys

UNITED STATES PATENT OFFICE.

DAVID M. ROWE, OF OGLESBY, ILLINOIS.

EGG-CRATE.

No. 898,007.  Specification of Letters Patent.  Patented Sept. 8, 1908.

Application filed March 21, 1907. Serial No. 363,625.

*To all whom it may concern:*

Be it known that I, DAVID M. ROWE, a citizen of the United States, residing at Oglesby, in the county of Lasalle and State of Illinois, have invented certain new and useful Improvements in Egg-Crates; and I do declare the following to be a full, clear, and exact description of the invention, such as will enable others skilled in the art to which it appertains to make and use the same.

This invention relates to improvements in egg crates.

The object of the invention is to provide a crate of this character having means whereby eggs may be securely held and prevented from being broken during shipment, or from rough handling of the crate.

With this object in view, the invention consists of certain novel features of construction, combination and arrangement of parts as will be more fully described and particularly pointed out in the appended claims.

In the accompanying drawings, Figure 1 is a side elevation of an egg crate constructed and arranged in accordance with the invention; and showing the door or cover of the crate removed; Fig. 2 is a horizontal sectional view of the same; Fig. 3 is a vertical sectional view through a portion of one of the egg trays and one of the egg holding springs thereon; Fig. 4 is a detail perspective view of one of the egg holding springs; Fig. 5 is a plan view of the stamped-out blank from which the spring is formed; and Fig. 6 is a perspective view of a modified form of the egg holding spring.

Referring more particularly to the drawings, 1 denotes the crate, which is preferably in the form of a closed box or casing constructed of any suitable material and may be in any desired shape, the same being here shown as constructed of wood, and in rectangular form. Adapted to be arranged in the crate, 1, is a series of egg holding trays, 2, on which are secured egg holding springs, 3, the number of which may be varied according to the size of the trays and crate.

The springs 3 are preferably formed from a single piece of spring metal, and are stamped out of said metal by suitable dies, and consist of a series of spring metal arms, or fingers 4, which project in opposite directions at diametrically opposite points from a circular center piece or base 5. After the springs have thus been stamped out to form the arms or fingers, 4, said arms are bent upwardly around a suitable egg shaped mold or form, by means of which they are curved or bent first outwardly and then inwardly at their upper ends so that together they form an egg shaped frame or receptacle. The extreme upper ends of the arms 4 are bent outwardly so as to facilitate the engagement of the eggs with the same, said arms being forced outwardly by the pressure of the egg pushed between them to permit the egg to pass into the outwardly curved lower portions of the same, after which the spring action of the arms will cause them to close together, and fit snugly around the egg, thus firmly holding the same against movement when the crate is handled.

The trays 2 may be of any suitable construction and formed of any suitable material, said trays are preferably in the form of thin flat boards or sheet metal plates. The egg holding springs are secured to one side of said trays by means of screws, 6, or other fastening devices, which are passed through centrally disposed openings formed in the base portion of the springs, as shown. On the base portion 5 of the springs are secured suitable pads, 7, said pads being preferably in the form of circular disks of felt, and are held in place by the screws or fastening devices, 6, which secure the springs to the tray. There may be any desired number of springs arranged on the trays, said number varying with the size of the tray. The crates, 1, may be formed of any desired size to hold any number of trays, 2, said trays being arranged one above the other in the crate, the upper outwardly curved ends of the spring arms or fingers 4 serving as supports for the next tray above. The trays are adapted to be inserted in and removed from the crate through an opening in one side thereof, which is adapted to be closed by a suitable door or cover, not shown.

In Fig. 6 of the drawings is shown a modified form of the egg holding spring, the same being shown in this instance as constructed from two strips of metal, each of which is stamped out to form a pair of oppositely projecting spring holding arms or fingers, 8, and a central base portion, 9. The arms 8 are adapted to be bent upwardly and shaped in the same manner as described in connection with the first form of springs. The base portion, 9, is provided with a central screw hole, 10, which, when the arms are arranged in position to form the egg receptacle, will be alined and through said alined holes, 10, is adapted to be inserted a fastening screw to secure said springs to the tray.

From the foregoing description, taken in connection with the accompanying drawings, the construction and operation of the invention may be readily understood without requiring a more extended explanation.

Various changes in the form, proportion and minor details of construction may be resorted to without departing from the principle or sacrificing any of the advantages of this invention as defined in the appended claims.

Having thus fully described my invention, what I claim as new, and desire to secure by Letters-Patent, is:

1. An egg crate comprising a box or casing, a series of trays arranged therein, spring holding devices arranged on said trays, said devices comprising an apertured base portion, a series of integrally formed upwardly projecting spring metal holding arms, circular pads arranged in the base of said devices, and screws adapted to be inserted through said pads and the base portion of the egg holding devices to secure the latter to the trays, substantially as described.

2. In an egg crate, a series of trays, a series of egg holding devices, said devices comprising a central apertured attaching plate, fastening means adapted to be inserted through the aperture in said plate, a series of radially projecting upwardly curved egg holding arms formed integral with said plate, outwardly curved supporting fingers on the upper ends of said arms to support the next tray above, and pads arranged on said plate and secured by said fastening means, substantially as described.

3. An egg crate comprising a box or casing, a series of trays arranged therein, spring egg holding devices arranged on said trays, said devices comprising an apertured base portion, a series of integrally formed upwardly projecting spring metal egg holding arms bent to fit an egg, said arms being bent outwardly at their upper ends to form supports for the next tray above, circular pads arranged on the base of said devices, and screws adapted to be inserted through said pads and the base portion of said egg holding devices to secure the same to the trays, substantially as described.

In testimony whereof I have hereunto set my hand in presence of two subscribing witnesses.

DAVID M. ROWE

Witnesses:
  JAS. W. KIDD,
  THOS. A. KIDD.